US010405005B1

(12) United States Patent
McDermott

(10) Patent No.: US 10,405,005 B1
(45) Date of Patent: Sep. 3, 2019

(54) METHODS AND SYSTEMS FOR VIDEO COMPRESSION BASED ON DYNAMIC VECTOR WAVE COMPRESSION

(71) Applicant: Sherman McDermott, Pueblo, CO (US)

(72) Inventor: Sherman McDermott, Pueblo, CO (US)

( * ) Notice: Subject to any disclaimer, the term of this patent is extended or adjusted under 35 U.S.C. 154(b) by 0 days.

(21) Appl. No.: 16/202,091

(22) Filed: Nov. 28, 2018

(51) Int. Cl.
*H04N 19/90* (2014.01)
*H04N 19/164* (2014.01)
*H04N 19/186* (2014.01)
*H04N 19/172* (2014.01)

(52) U.S. Cl.
CPC ........... *H04N 19/90* (2014.11); *H04N 19/164* (2014.11); *H04N 19/172* (2014.11); *H04N 19/186* (2014.11)

(58) Field of Classification Search
CPC .... H04N 19/90; H04N 19/164; H04N 19/172; H04N 19/186
USPC .................................................... 375/240.01
See application file for complete search history.

(56) References Cited

U.S. PATENT DOCUMENTS

| 5,930,394 | A | * | 7/1999 | Kondo | ................. | H04N 19/647 |
| | | | | | | 375/E7.049 |
| 5,949,422 | A | * | 9/1999 | Mochizuki | ................ | G06T 9/20 |
| | | | | | | 345/420 |
| 8,102,916 | B1 | | 1/2012 | Masterson et al. | | |
| 8,275,909 | B1 | | 9/2012 | Rothstein | | |
| 8,964,835 | B2 | | 2/2015 | Pace | | |
| 9,929,745 | B2 | | 3/2018 | Rubanovich et al. | | |
| 2014/0253743 | A1 | * | 9/2014 | Loxam | ................... | H04N 5/232 |
| | | | | | | 348/207.1 |
| 2017/0103529 | A1 | | 4/2017 | Shi et al. | | |

OTHER PUBLICATIONS

Schroder et al., "Combined Description of Shape and Motion in an Object Based Coding Scheme Using Curved Triangles", 1995, IEEE 0-8186-7310-9, pp. 390-393. (Year: 1995).*

* cited by examiner

*Primary Examiner* — Matthew K Kwan
(74) *Attorney, Agent, or Firm* — Kanika Radhakrishnan; Evergreen Valley Law Group

(57) ABSTRACT

Embodiments disclose methods and systems for video compression using dynamic vector wave compression. The method includes receiving a video content including a plurality of image frames. The method includes identifying shapes in each image frame and classifying each shape into at least one of a first set of shapes with areas of low color fluctuation and a second set of shapes associated with areas of high color fluctuation. The method includes determining movement of each shape across the plurality of image frames by 3D vector analysis for determining a set of shape movement data. The method includes generating a first set of data by performing a generalized bulk sine wave transform for the first set of shapes and a second set of data by performing a complex area shell management and a layered sine wave transform for the second set of shapes.

21 Claims, 11 Drawing Sheets

METHODS AND SYSTEMS FOR VIDEO COMPRESSION BASED ON DYNAMIC VECTOR WAVE COMPRESSION

TECHNICAL FIELD

Embodiments of the disclosure relate generally to video compression and, more particularly to, method and a system for video compression and decompression using dynamic vector wave compression.

BACKGROUND

Due to rapid developments in technologies such as, the Internet and computers, the popularity of applications for video streaming are on the rise. Additionally, ease of access to social networking sites over smartphones has surged viewing of video content on the smartphones. However, storing and transmitting uncompressed raw video requires large storage space and network bandwidth.

For handling the large storage space and network bandwidth issue, a variety of video compression techniques have been employed. Conventionally, video compression techniques are all about reducing and removing redundant video data so that the video content can be effectively sent over a network and/or stored on computer disks. With efficient compression techniques, a significant reduction in file size of the video content can be achieved with little adverse effect on the visual quality of the video content.

Currently available compression techniques use an MPEG matrix approach and three categories of frames (I, P, F) for performing video compression. Typically, the maximum bandwidth reduction that can be achieved using these techniques is around 60%, and these techniques may also affect the quality of the video data received after compression.

In light of the above discussion and the constant effort of researchers for optimization in compression techniques, there exists a need for a video compression mechanism that reduces the amount of bandwidth required for transmitting a video over a network without reducing the quality of the video content.

SUMMARY

Various embodiments of the present disclosure provide methods and systems for video compression using dynamic vector wave compression.

In an embodiment, a method of video compression using dynamic vector wave compression is disclosed. The method includes receiving a video content comprising a plurality of image frames. The method includes identifying one or more shapes in each image frame of the plurality of image frames. Each shape of the one or more shapes is associated with at least a shape point and a key point. The method also includes classifying each shape of the one or more shapes into at least one of a first set of shapes and a second set of shapes. The first set of shapes are associated with areas in an image frame of low color fluctuation and the second set of shapes are associated with areas in the image frame with high color fluctuation. The method includes determining movement of each shape of the one or more shapes across the plurality of image frames by three-dimensional vector analysis for determining a set of shape movement data based on a preset compression level. The movement of each shape is represented as the shape point of the shape, the key point of a shape, a current location of the shape, a set of coordinates that the point moved to and a distance. The method also includes generating a first set of data by performing a generalized bulk sine wave (GBS) transform for the first set of shapes based on the preset compression level. The method includes generating a second set of data by performing a complex area shell management (CASM) and a layered sine wave transform (LST) for the second set of shapes based on the preset compression level. The method further includes storing a compressed video content as array data, where the compressed video content includes the first set of data, the second set of data and the set of shape movement data.

In another embodiment, a server system of video compression using dynamic vector wave compression is disclosed. The server system includes a memory configured to store instructions and a processor configured to execute the instructions stored in the memory and thereby cause the server system to perform the method. The method includes receiving a video content comprising a plurality of image frames. The method includes identifying one or more shapes in each image frame of the plurality of image frames. Each shape of the one or more shapes is associated with at least a shape point and a key point. The method also includes classifying each shape of the one or more shapes into at least one of a first set of shapes and a second set of shapes. The first set of shapes are associated with areas in an image frame of low color fluctuation (i.e. areas which have color fluctuation less than a threshold value) and the second set of shapes are associated with areas in the image frame with high color fluctuation (i.e. area which have color fluctuation greater than the threshold value). The method includes determining movement of each shape of the one or more shapes across the plurality of image frames by three-dimensional vector analysis for determining a set of shape movement data based on a preset compression level. The movement of each shape is represented as the shape point of the shape, the key point of a shape, a current location of the shape, a set of coordinates that the point moved to and a distance. The method also includes generating a first set of data by performing a generalized bulk sine wave (GBS) transform for the first set of shapes based on the preset compression level. The method includes generating a second set of data by performing a complex area shell management (CASM) and a layered sine wave transform (LST) for the second set of shapes based on the preset compression level. The method further includes storing a compressed video content as array data, the compressed video content comprising the first set of data, the second set of data and the set of shape movement data.

BRIEF DESCRIPTION OF THE FIGURES

For a more complete understanding of example embodiments of the present technology, reference is now made to the following descriptions taken in connection with the accompanying drawings in which.

Figure 1:
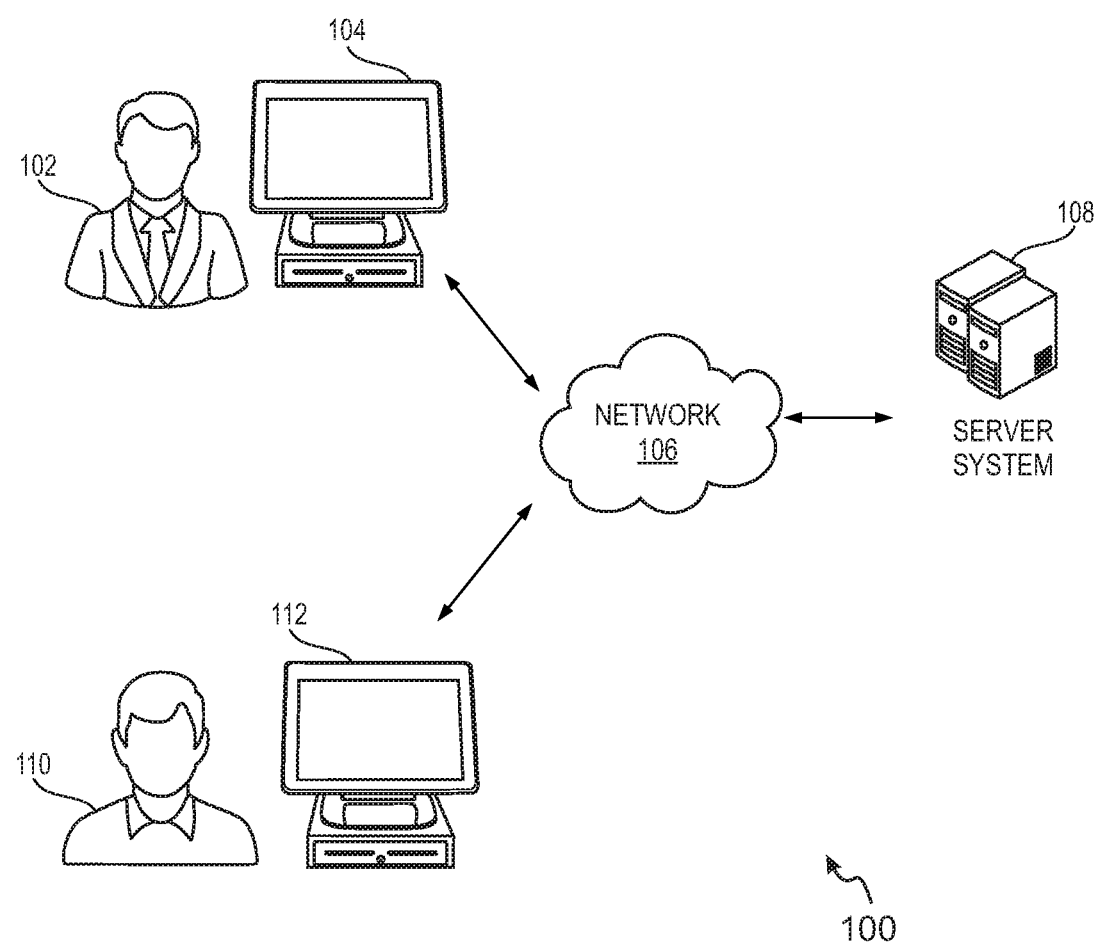
FIG. 1 is an illustration of an environment, where at least some example embodiments can be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. In other instances, systems and methods are shown in block diagram form only in order to avoid obscuring the present disclosure.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

OVERVIEW

Various example embodiments of the present disclosure provide methods and systems for video compression using dynamic vector wave compression.

Embodiments of the present disclosure provide techniques for compressing and decompressing of video content using dynamic vector wave compression. A server may be configured to perform the compression of the video content and store an array data of compressed video content in an associated storage space. When a user requests for the video content from a user device, the server sends the compressed video data corresponding to the video content to the user device on receiving the request. Therefore decompression of the compressed video data is performed at the user device (also referred to as 'a client side'). The server employs dynamic vector wave compression on the video content for compressing the video content. The video content may include a plurality of image frames. The server is configured to identify one or more shapes present in each image frame of the plurality of image frames. The identified shapes are assigned a unique shape number and the key points of the shapes are saved. Further, the movement of the shapes among the plurality of image frames is plotted by the server. The plotting of movement of the shapes across the plurality of image frames is referred to as Next Frame Movement (NFM). The plotting of the movement may reduce the number of redundant points needed for image description. In one example embodiment, the server identifies shapes (S1, S2) in a first image frame. The movement of the shapes S1, S2 across subsequent frames are tracked and plotted. If any new shape is identified in the subsequent frames, the shapes are provided with a unique shape number and the key points of the shapes are saved. The movement of these new shapes across remaining frames of the plurality of frames are tracked based on NFM.

In some example embodiments, the one or more shapes are classified as (1) a first set of shapes with areas of an image frame having color fluctuations less than a threshold value (hereinafter also referred to as 'low color fluctuation'), and (2) a second set of shapes with areas of the image frame having color fluctuations greater than the threshold value (hereinafter also referred to as 'high color fluctuation'). The server may perform a Generalized Bulk Sine wave (GBS) transform for encoding the first set of shapes. The second set of shapes with areas of high color fluctuation are handled separately from most areas of the video content as GBS transform would be extremely inefficient to compress the high color fluctuation areas. For the second set of shapes with areas of high color fluctuation, firstly, a Complex Area Shell Management (CASM) is performed in which small detailed areas are grouped further. The small detailed areas are referred to as CASM areas. The server then performs a Layered Sine wave Transform (LST) on the CASM areas for compressing the CASM areas. The data collected after performing NFM, GBS transform, CASM and LST is arranged in form of two-dimensional arrays by the server. All the arrays are further grouped together to form an array data (i.e. array of data). The array data can be further compressed using one or more compression techniques for reducing bandwidth consumption. The server may send compressed array data of compressed video content to an electronic device requesting the video content.

The electronic device, after receiving the compressed video content, may perform decompression before playing back the video content. The electronic device may start the decompression by first plotting points from the compressed array data. Then, NFM is run on the compressed array data to determine movement of key points across the plurality of image frames. Accordingly, the shapes (the first set of shapes and the second set of shapes) are reconstructed based on NFM. After reconstructing the shapes, the array data is used to reconstruct CASM areas. The LST is run on the CASM areas to generate sine waves. Further, sine waves are also generated for the GBS data. Once sine waves are generated for both areas (high color fluctuation and low color fluctuation), Riemann approximations may be used to extract color data associated with the shapes (e.g., first set of shapes and the second set of shapes) in the image frame. The video content is played back by performing NFM to plot movement of the shapes across the plurality of image frames.

FIG. 1 is an illustration of an environment 100 where at least some example embodiments may be practiced. The environment 100 depicts two individuals, a user 102 and a user 110. The user 102 (hereinafter referred to as a 'video content creator 102') is depicted to be associated with an electronic device 104 and the user 110 (hereinafter referred to as a 'video viewer 110') is depicted to be associated with an electronic device 112. The electronic devices 104 and 112 are exemplarily depicted as laptops. It is understood that the electronic devices 104 and 112 associated with the users 102 and 110 respectively, may be embodied in various forms, such as a mobile phone, a computer, a PDA (Personal Digital Assistant), a Mobile Internet Device (MID), a tablet computer, an Ultra-Mobile personal computer (UMPC), a phablet computer, a handheld personal computer and the like.

In an embodiment, the user 102 may have created a video content that he/she intends to upload on a video streaming application, such as YouTube®, Amazon Prime®, Netflix® etc. The user 102 may access an instance of the video streaming application from a video streaming application server (hereinafter referred to as a 'server 108') through his/her electronic device 104 using a network, such as a network 106 for uploading the video content on the video streaming application. Examples of the network 106 include stand alone or a combination of a local area network (LAN), a wide area network (WAN), wireless, wired, any currently existing or to be developed network that can be used for communication. More specifically, an example of the network 106 can be the Internet which may be a combination of a plurality of networks. As the video content exists in an uncompressed form, the bandwidth required for uploading the video content on the server 108 and a space required to save the video content on the server 108 may be significantly high. The server 108 may compress the video content provided by the user 102 before storing the video content on the server 108 so that the storage space required for storing the video content is significantly reduced and the video content can easily be streamed or shared with any other users (viewers) upon a request received from the viewers at a cost of lesser bandwidth. It should be noted that the server 108 need not to be necessarily associated with the video streaming application as it can be a stand-alone server used for video compression.

In at least one example embodiment, the server 108 may employ a dynamic vector wave compression method (explained in detail with reference to FIG. 2) for compressing the video content before storing it on the server 108. The server 108 may be a local server and can be a physical server present at a geographical location. Alternatively, or additionally, the server 108 can be a remote server, such as a cloud-based server. The server 108 may be a server associated with a video streaming application, which provides a plurality of videos for viewing/downloading. The server 108 includes a memory and one or more processors. The memory includes instructions for processing data. The processor executes the instructions stored in memory and facilitates video compression to be used in an environment, such as the environment 100.

In an embodiment, the user 110 may want to view the video content uploaded by the user 102 on the video streaming application through his electronic device 112. The user may send a request to the server 108 to playback the video content. After receiving the request, the server 108 may send the requested video content in a compressed format for display on the electronic device 112 via the network 106. The electronic device 112, after receiving the video in the compressed format, may decompress the compressed video content for facilitating playback on the electronic device 112 associated with the user 110. The electronic device 112 may again use the dynamic vector wave compression method to decompress the compressed video content received by the electronic device 112. In an embodiment, the decompression can be done by the server 108 prior to sending the video content. The decompressed video content may now be available to user 110 on his electronic device 112 for viewing/downloading.

An embodiment for compressing the video content is further explained with reference to FIG. 2A.

Figure 2A:
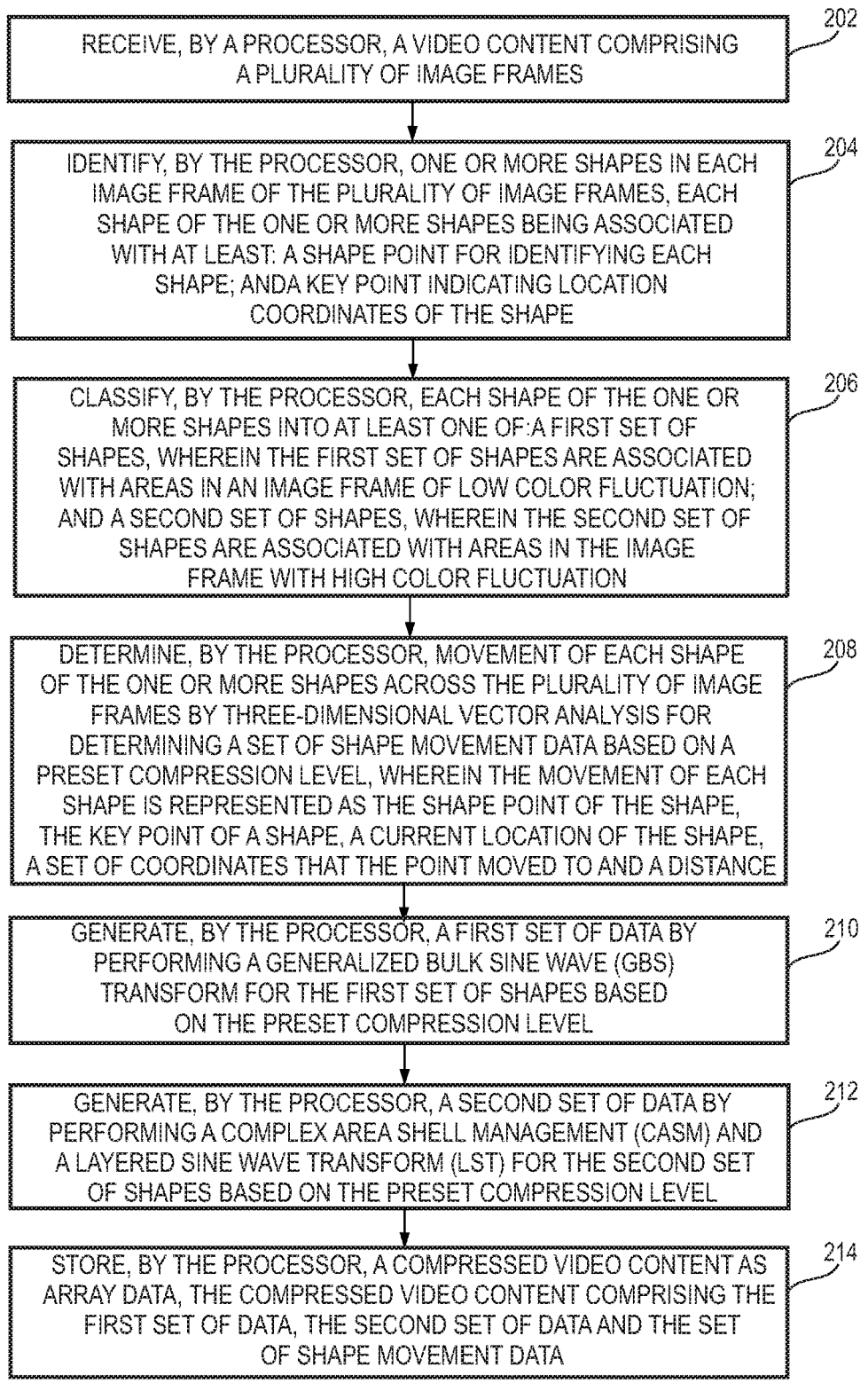
FIG. 2A is a flowchart of a method for video compression using dynamic vector wave compression, in accordance with an example embodiment.

FIG. 2A is a flowchart illustrating a method 200 for video compression using dynamic vector wave compression, in accordance with an example embodiment. The operations of the method 200 may be carried out by a server such as the server 108 or the electronic device 112. The sequence of operations of the method 200 may not be necessarily executed in the same order as they are presented. Further, one or more operations may be grouped together and performed in form of a single step, or one operation may have several sub-steps that may be performed in parallel or in a sequential manner.

At operation 202, the method 200 includes receiving, by a processor, a video content comprising a plurality of image frames.

At operation 204, the method 200 includes identifying, by the processor, one or more shapes in each image frame of the plurality of image frames. In at least one example embodiment, shapes in an image frame are identified by combining a plurality of pixels based on color similarities. For example, an upper bound on a standard deviation for grouping pixels is predefined. Accordingly, pixels within the upper bound of the standard deviation are grouped together based on color similarity. For example, shapes S1, S2 and S3 may be identified in an image frame (I1) based on color similarity. As an example, the shape S1 may include pixels in a shade of red and the shape S2 may include pixels in a shade of black. In at least one example embodiment, each shape is associated with at least one key point indicating location coordinates of the shape. The key point is used to indicate a source/origin of the shape. More specifically, position of the shape in an image frame is determined from the at least one key point. Additionally or optionally, each shape of the one or more shapes is assigned a shape number. The one or more shapes identified in the image frame I1 are assigned a number for identification of the shapes in the image frame. For examples, shapes S1, S2, S3 of the image frame (I1) are assigned shape numbers $P_{11}$, $P_{12}$, $P_{13}$, respectively. The shape number of each shape in the image frame (I1) is saved as a metadata for the first image frame (I1). It shall be noted that subsequent appearance of the same shape does not require providing new numbers to the shapes. However, shapes identified earlier are referenced using the shape number prior. For example, shapes S1, S2, S3, S4 may appear in an image frame (I2) subsequent to the image frame (I1). The shapes S1, S2 and S3 are referenced using respective shape numbers $P_{11}$, $P_{12}$, $P_{13}$, respectively and stored as metadata for the image frame (I2) whereas the shape S4 is assigned a shape number $P_{21}$ and stored as metadata for the image frame (I2).

At operation 206, the method 200 includes classifying, by the processor, each shape of the one or more shapes into at least one of a first set of shapes (A1) and a second set of shapes (A2). The first set of shapes (A1) is associated with areas in an image frame of low color fluctuation and the second set of shapes (A2) is associated with areas in the image frame with high color fluctuation. For example, shapes S1, S3 may include areas of low color fluctuation and accordingly, classified as the first set of shapes (A1) whereas the shapes S2, S4 may be areas (or regions) in the image frames (I1, I2) of high color fluctuations and are classified as the second set of shapes (A2). In an embodiment, the low color fluctuations refer to a scenario where maximum different in color intensities within the pixels of a shape is less than a threshold value. Similarly, the high color fluctuations refer to a scenario where maximum different in color intensities within the pixels of a shape is more than the threshold value.

At operation 208, the method 200 includes determining, by the processor, movement of each shape of the one or more shapes across the plurality of image frames by three-dimensional vector analysis for determining a set of shape movement data (D1) based on a preset compression level. This process is also referred to as Next Frame Movement (NFM). For example, shapes S1, S2 are present in image frames (I1, I2, I3, I4). In such cases, the shapes S1, S2 are not encoded for each of the image frames I1, I2, I3 and I4. The shapes S1, S2 are encoded for the image frame I1. However, the NFM is employed to determine the movement of the shapes S1, S2 (shape movement data d1, d2 of the shapes S1, S2) across the frames from I1 to I2, I2 to I3 and I3 to I4. The movement of each shape is represented as a key point of a shape, a current location of the shape, a set of coordinates that the point moved to and a hard-coded set distance. The key point of a shape indicates a source point/origin for the respective shape. The key point is used as a reference to determine the current location/position in an image frame and the movement of the key point across image frames is tracked to determine the movement of the shapes. Additionally, one or more reconstruction equations for each shape of the one or more shapes are determined. The one or more reconstruction equations for each shape help in decompressing a compressed video content. The one or more reconstruction equations include at least an angle of movement and a distance of movement. The distance of movement of each shape of the one or more shapes defines movement of the shape across at least a set of image frames among the plurality of image frames. The one or more reconstruction equations are stored along with the compressed video content. The preset compression level is determined by defining one or more of a total number of shapes permitted per frame, a predefined range for change in angle of the one or more shapes, and a number of sine wave functions for defining each shape of the second set of shapes. Assuming the predefined range for change in angle is defined as 10°, for example, if the shape S1 is present in the image frame I1 and I2 and assuming the shape S1 has moved by 25°, the shape S1 for the image frame I2 has to be encoded for the frames I1 and I2.

At operation 210, the method 200 includes generating, by the processor, a first set of data by performing a generalized bulk sine wave (GBS) transform for the first set of shapes based on the preset compression level. In at least one example embodiment, a plurality of color values for each pixel present in each shape of the first set of shapes is determined. For example, RGB values of each pixel in the shape S1 may be determined. The colour values for the pixels in each shape (e.g., shape S1) are plotted to determine a gradient of color shifts of the pixels in the shape S1. In at least one example embodiment, a plurality of primary sine waves is generated for the first set of shapes based on the gradient of the first set of shapes. For example, a gradient $(G_{11})$ is plotted for R values in the shape S1. Similarly, gradients $(G_{12}, G_{13})$ are plotted for the G values and B values respectively in the shape S1 for determining a colour shift within the shape S1. In a similar fashion, a plurality of gradients is plotted for the plurality of first set of shapes based on respective RGB value. In some example embodiments, a primary sine wave (P1) matching the gradient $G_{11}$ for the shape S1 is determined from a repository of sine waves (P1, P2, P3, . . . Pn). It shall be noted that the repository of sine waves refer to a collection of sine waves of varying amplitude and frequency. In an example, the primary sine wave (P1) that closely matches the gradient $G_{11}$ is determined to be the primary sine wave for representing the gradient of the shape S1 for the R value. Accordingly, the plurality of primary sine waves is determined based on respective gradients for each color value in each shape. The plurality of primary sine waves may be grouped into chunks of waves. In an embodiment, the plurality of primary sine waves need not be sent as such and one or more wave points are detected in each primary sine wave of the plurality of primary sine waves. For example, the wave points are samples of each primary sine wave (e.g., the primary sine wave P1) that are collected and may be used for reconstructing the primary sine wave P1. The plurality of primary sine waves and the wave points are used to generate the first set of data for the first set of shapes based on GBS.

At operation 212, the method 200 includes generating, by the processor, a second set of data by performing a complex area shell management (CASM) and a layered sine wave transform (LST) for the second set of shapes based on the preset compression level. In at least one example embodiment, a plurality of shells among the second set of shapes are identified by tracing around each shape of the second set of shapes for determining an edge of each shape. The shells are shapes and are traced around to identify edges of the shapes and one or more parameters of the shell, such as, shape, dimensions, shape point of shapes forming a part of the shell, key points of the shapes. In some example embodiments, a plurality of color values, for example, RGB values for each pixel in each shell is determined for determining texture of the shapes. Further, one or more sine waves are generated for each shell/shape based on the shape and the plurality of colour values using sine wave modifiers. The one or more sine waves are modified and updated to closely match the shape and the texture of each shape of the second set of shapes. Furthermore, a set of wave data for the plurality of shells is determined that corresponds to sine waves of the plurality of shells. Each shape of the second set of shapes is filled with corresponding one or more sine waves. Subsequently, a complex sine wave is generated from the set of wave data using a plurality of transforms. For example, a secondary sine wave is selected for the second set of shapes from a repository of sine waves. The secondary sine wave is selected for the second set of shapes based on the set of wave data. Additionally or optionally, the secondary sine wave may be adapted dynamically to match the set of wave data. The secondary sine wave is further transformed by applying one or more transforms to generate the complex sine wave. In one example embodiment, 64 transforms are employed to determine the complex sine wave. The set of wave data corresponding to the second set of shapes is further compressed using the complex sine wave for generating the second set of data.

At operation 214, the method 200 includes storing, by the processor, a compressed video content. The compressed video content includes the first set of data, the second set of data and the set of shape movement data. The first set of data, the second set of data and the set of shape movement data are represented as array data. The array data is a combination of arrays created for each of the first set of data, the second set of data and the set of shape movement data. Further, the array data is compressed using one or more compression techniques known in the art to generate a compressed video data corresponding to the video content.

Figure 2B:
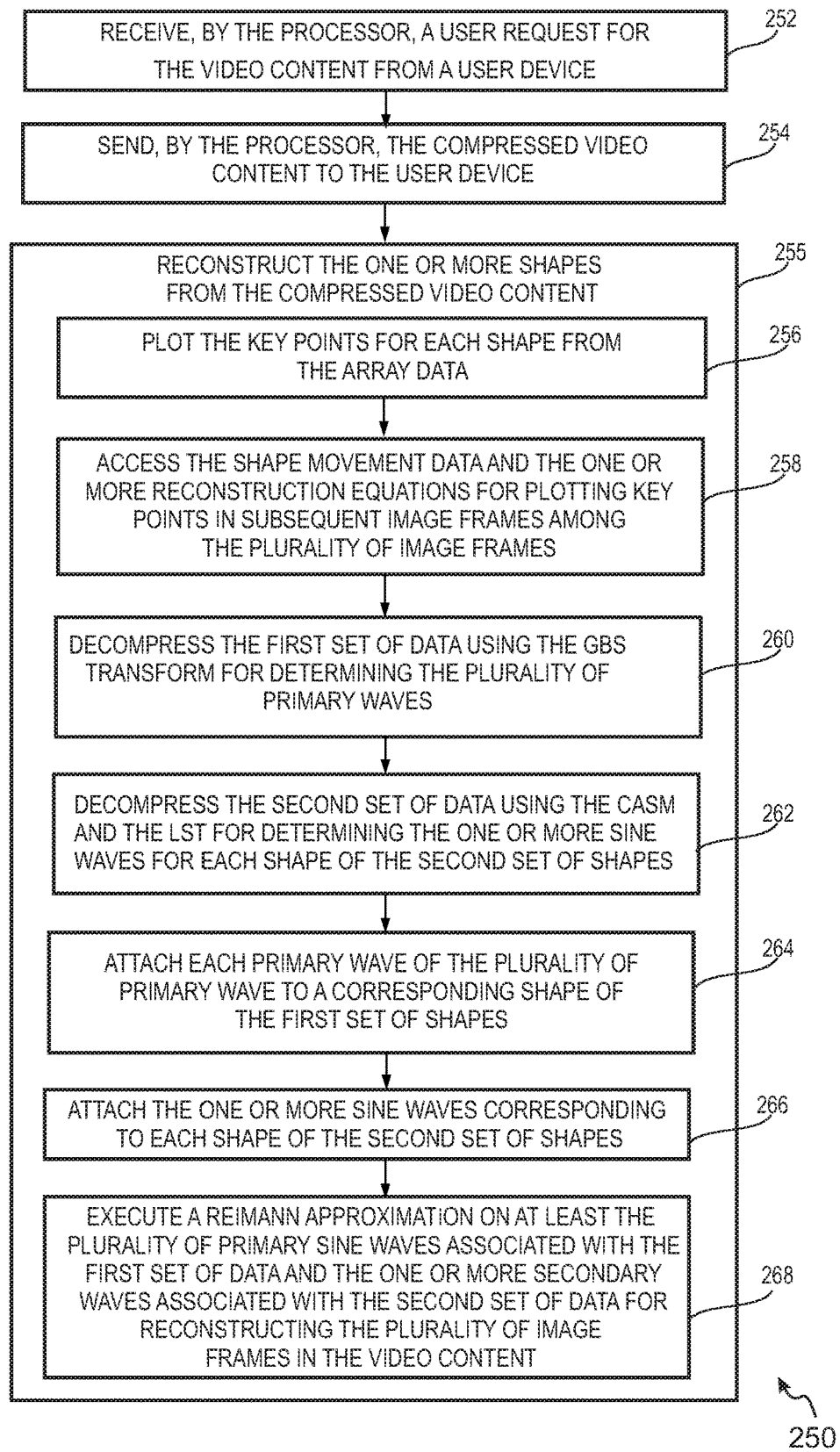
FIG. 2B is a flowchart of a method for video decompression based on dynamic vector wave compression, in accordance with an example embodiment.

FIG. 2B is a flowchart illustrating a method 250 for video decompression using dynamic vector wave compression, in accordance with an example embodiment. The operations of the method 250 may be carried out by a server such as the server 108 or the electronic device 112. The sequence of operations of the method 250 may not be necessarily executed in the same order as they are presented. Further, one or more operations may be grouped together and performed in form of a single step, or one operation may have several sub-steps that may be performed in parallel or in sequential manner.

At operation 252, the method 250 includes receiving, by the processor, a user request for the video content from a user device.

At operation 254, the method 250 includes sending, by the processor, the compressed video content to the user device, wherein the user device is configured to reconstruct (the operation 255) the one or more shapes from the compressed video content by performing operations 256-268.

At operation 256, the method 250 includes plotting the key points for each shape from the compressed video content. At operation 258, the method 250 includes accessing the shape movement data from the compressed video content and one or more reconstruction equations for plotting key points in subsequent image frames among the plurality of image frames. In an embodiment, NFM is performed using the shape movement data to reconstruct the shapes in the plurality of image frames.

At operation 260, the method 250 includes decompressing the first set of data using the GBS for determining the plurality of primary waves. The first set of data is used to retrieve the wave chunks. More specifically, wave points (also referred to as 'samples') of each primary wave are retrieved from the first set of data and are used to reconstruct the primary wave corresponding to a pixel/color value of the shape. For example, the first wave of a bundle is reconstructed and subsequent primary waves of the plurality of primary waves are reconstructed using the wave points from the first set of data. At operation 262, the method 250 includes decompressing the second set of data using the CASM and the LST for determining the one or more sine waves for each shape of the second set of shapes.

At operation 264, the method 250 includes attaching each primary wave among the plurality of primary wave to a corresponding shape of the first set of shapes. At operation 266, the method 250 includes attaching the one or more secondary waves to a corresponding shape of the second set of shapes.

At operation 268, the method 250 includes executing a Reimann approximation on at least the plurality of primary sine waves associated with the first set of data and the one or more secondary waves associated with the second set of data for reconstructing the plurality of image frames in the video content. The Reimann approximation is run on the plurality of primary sine waves and the one or more secondary waves to get the plurality of pixel values for each shape of the one or more shapes. The Reimann Approximation will fill the high color fluctuation areas (e.g., CASM areas/second set of shapes) and the low color fluctuation areas (e.g., GBS areas/first set of shapes).

Figure 3:
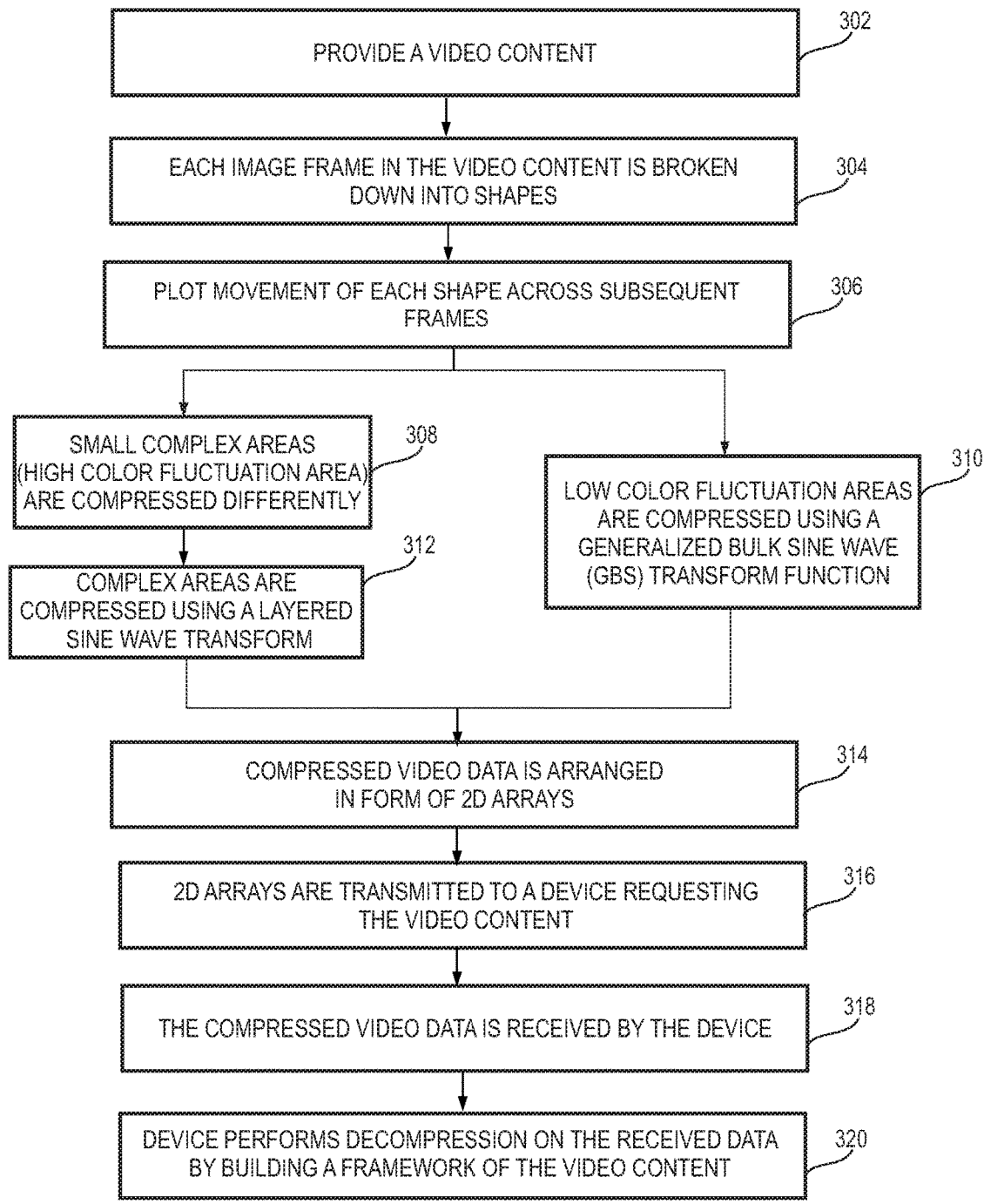
FIG. 3 is a simplified flowchart of compressing and decompressing a video content using dynamic vector wave compression, in accordance with an example embodiment.

FIG. 3 is a simplified flowchart illustrating a method 300 for video compression and decompression using dynamic vector wave compression, in accordance with an example embodiment. The operations of the method 300 may be carried out by a server such as the server 108 or the electronic device 112. In some example embodiments, the compression of the video content may be performed by the server 108 and the decompression of compressed video content may be performed by the user device 112 and/or the server 108. The sequence of operations of the method 300 may not be necessarily executed in the same order as they are presented. Further, one or more operations may be grouped together and performed in form of a single step, or one operation may have several sub-steps that may be performed in parallel or in sequential manner.

At operation 302, a video content (hereinafter referred to as a 'video data') that needs to be compressed is provided to the server. The server may start the compression process after receiving the video. The video content may include a plurality of image frames. At operation 304, each image frame of the plurality of image frames in the video content are broken down into shapes. In some example embodiments, the compression level is preset by assigning a predetermined resolution to the video content. For example, if the predetermined resolution for an image frame is preset at 1024×768, and the resolution of the video content is 1536× 1024, then each image frame of the plurality of image frames is broken into grids including 1024 rows and 768 columns. Each grid is filled with a dominant color pixel among surrounding pixels in order to comply with the predetermined resolution and to define edges of shapes. It shall be noted that each grid represents a pixel of an image frame. Breaking the image frames into shapes further includes counting number of image frames available in the video by typically using a 3 byte number that stores all of the image frame count numbers up to 16,777,215 total frames, and then determine shapes present in each image frame of the video content. Basically, color patterns that are indicative of an object can be used to group shapes by the similarities of the color patterns of the object that is being represented by the video. A standard deviation is used as a basis for dividing frames into shapes. The areas of low color fluctuations are classified as a first set of shapes (also referred to as GBS areas) and areas in an image frame of high color fluctuations (detailed areas/complex areas) are classified as a second set of shapes. The detailed areas or the second set of shapes are also referred to as CASM areas. In some example embodiments, the CASM areas are treated as a group of shapes and in some example embodiments as one big shape. The CASM for compressing the second set of shapes is explained in detail with reference to FIG. 5.

At operation 306, movement of the shapes present in each image frame is plotted. The shapes identified in an image frame may appear across subsequent image frames. The plotting of movement of shapes (Next frame movement (NFM)) present in image frame is explained in detail with reference to FIG. 4.

Figure 4:
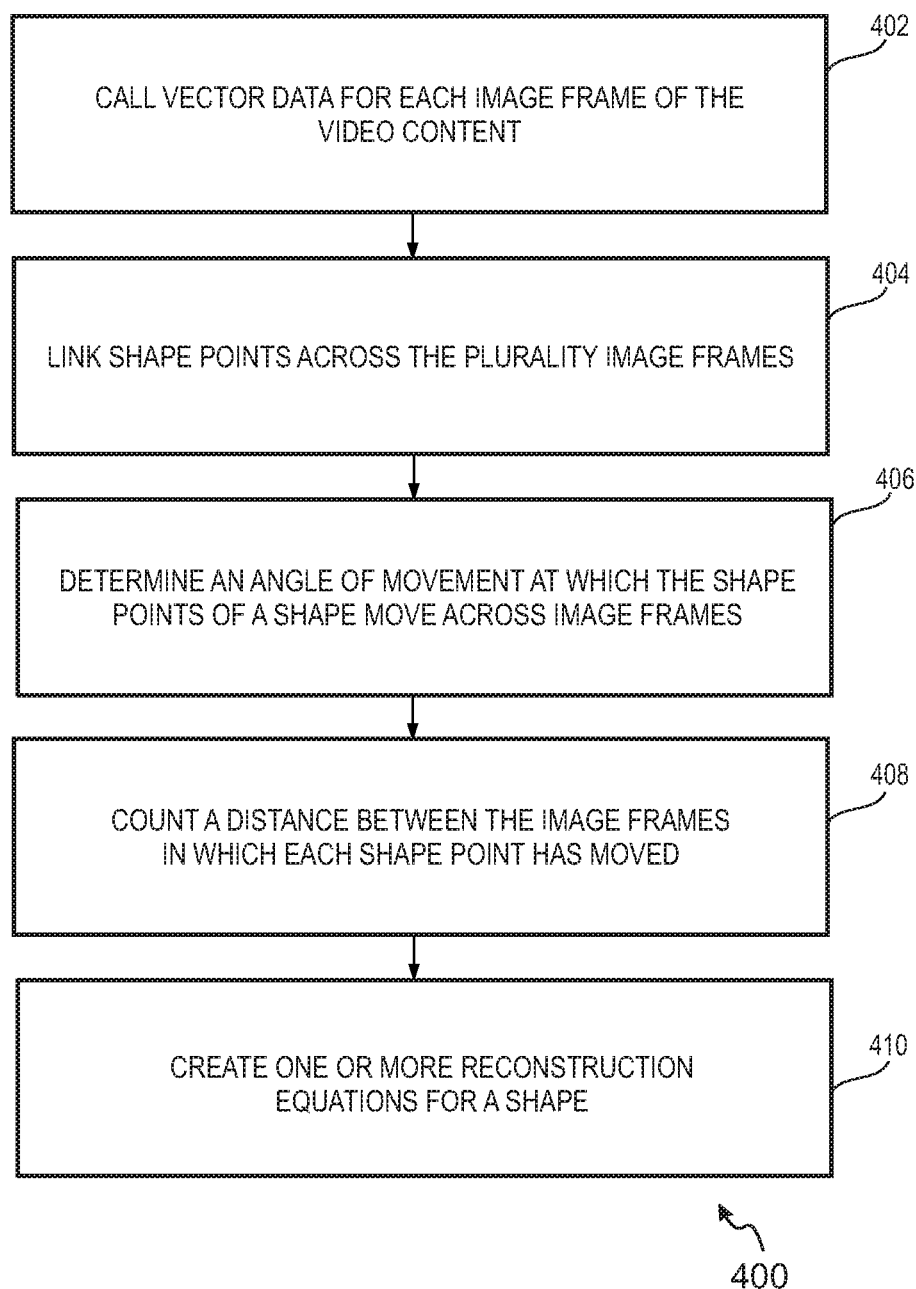
FIG. 4 is a flowchart of a method for determining a set of shape movement data by performing next frame movement (NFM), in accordance with an example embodiment.

Referring now to FIG. 4 in conjunction with FIG. 3, at operation 402, a vector data is called for each image frame of the video content. The vector data is the data used to outline the shapes (the first set of shapes and the second set of shapes) present in the image frame. The vector data for each shape is also referred to as shape points. The shape points for each shape are saved for future use. At operation 404, shape points are linked across the plurality of image frames. For example, a shape S1 with shape points b1, b2, b3, b4, b5 may be present in image frames I1, I2, I3 and I4 of the video content. However, the shape S1 may appear at different positions in the image frames I1, I2, I3 and I4 indicating movement of the shape S1. In such cases, the image frames I1 and I2 are overlaid and movement of the shape points b1, b2, b3, b4, b5 for the shape S1 is plotted over the image frames (I1, I2). The same process is continued for all of the plurality of image frames taking two consecutive image frames.

At operation 406, an angle of movement, at which the shape points of a shape move across image frames, is determined. At operation 408, a distance between the image frames in which shape points moved are counted. For example, a distance of movement of each shape of the one or more shapes across subsequent image frames is determined that defines movement of the shape across at least a set of image frames among the plurality of image frames. By measuring the distance between the image frames, the angle and the distance can be combined to create an end point which indicates position of the shape points.

At operation 410, one or more reconstruction equations (also referred to as 'a NFM equation') for a shape are created. The NFM equation includes a start point, a shape identifier, a point identifier (also referred to as 'a point ID') a distance of movement and angle of movement of a shape. The start point is key point of the shape which acts as a reference to a particular shape. The shape identifier is a shape number assigned to the shape. The point ID is a reference to a count that indicates a quadrant of the frame that the shape is located in. The distance refers to a distance in image frames that the shape points of the shape moves in a straight line across image frames and angle of movement indicates an angle of movement of the shape across image frames.

Referring back to FIG. 3, at operation 308, the complex areas are compressed differently than most areas of the video. As compressing complex areas would be extremely inefficient to compress the same way as the rest of the video, they are compressed using a different but more efficient method designed for small shapes in close proximity. As an example, at operation 310 (an example of the operation 308), the complex areas are compressed using a layered sine wave transform (LST). The LST creates a sine wave from color values of the shapes present in complex areas. A matrix of transforms may be used to create an approximation of the color values. The LST is discussed in detail with reference to FIG. 6.

At operation 312, the low color fluctuation areas are compressed using a Generalized Bulk Sine wave (GBS) transform function. The GBS transform method is explained in detail with reference to FIG. 7. At operation 314, the data produced at operation 310 and 312 is arranged in form of a two-dimensional (2D) array. The 2D arrays are made up of the compressed video data (also referred to as 'compressed video content') that is needed to recreate the image frames of the video.

At operation 316, the 2D arrays are transmitted to a device (e.g., the device 112) requesting the video content. At operation 318, the compressed video data is received by the device. In some example embodiments, if the 2D arrays have been compressed using one or more compression techniques, suitable decompression techniques are employed to decompress compressed 2D arrays to retrieve the first set of data, the second set of data and the shape movement data. At operation 320, the device may perform decompression on the received data by building a framework of the video content. In an example, the first set of data is decompressed using GBS for retrieving the first set of shapes and the second set of data is decompressed using CASM and LST for determining the second set of shapes. A Reimann approximation may further be performed to extract the color data/values associated with the one or more shapes (the first set of shapes and the second set of shapes) for the video content. The decompression is explained in detail with reference to FIG. 8.

Figure 5:
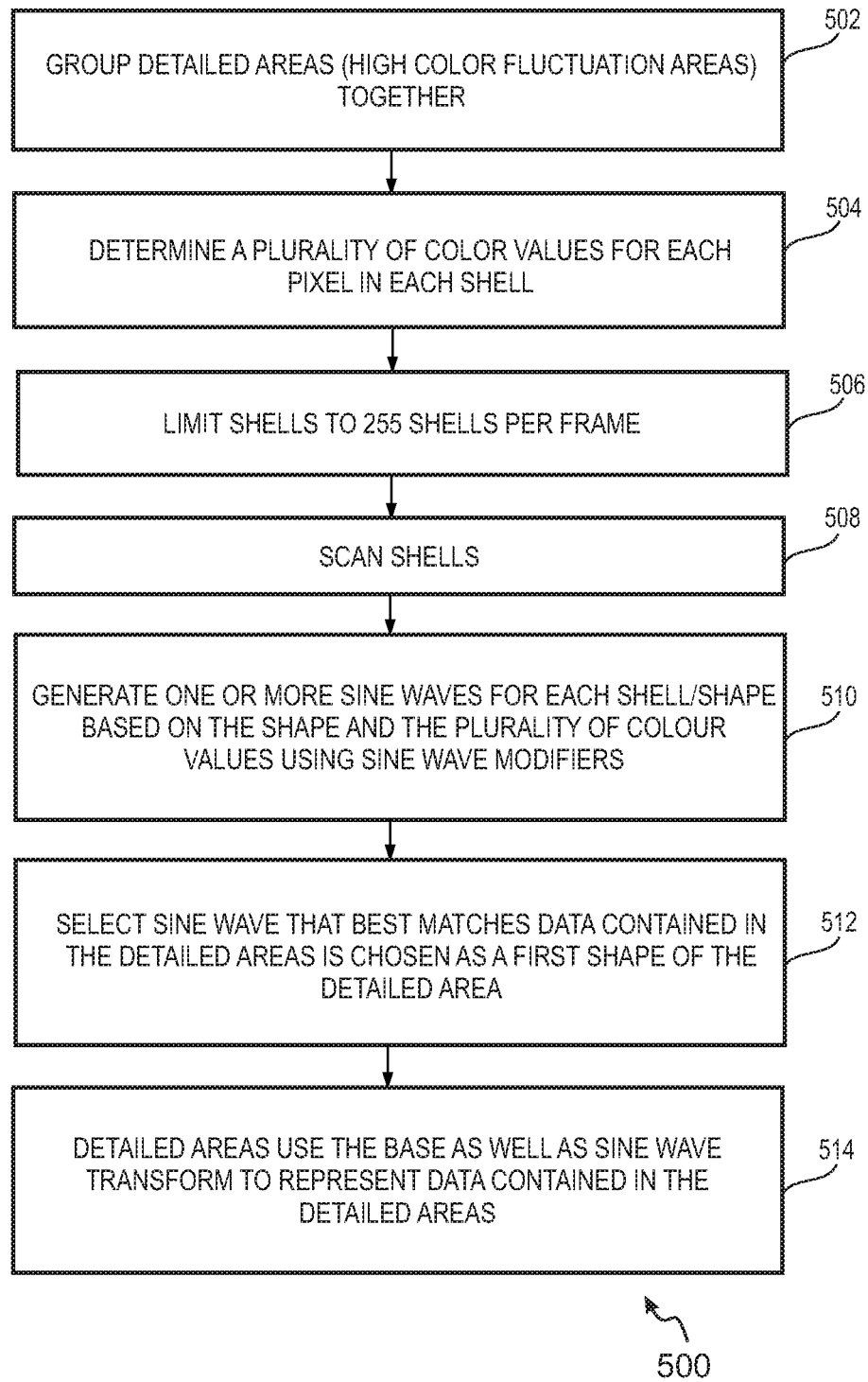
FIG. 5 is a flowchart of a method for performing Complex Area Shell Management (CASM) on a second set of shapes with areas of high color fluctuation, in accordance with an example embodiment.

FIG. 5 is a flowchart illustrating a method 500 for performing complex areas shell management (CASM) on high color fluctuation areas (or the second set of shapes), in accordance with an example embodiment. The sequence of operations of the method 500 may not be necessarily executed in the same order as they are presented. Further, one or more operations may be grouped together and performed in form of a single step, or one operation may have several sub-steps that may be performed in parallel or in sequential manner.

At operation 502, the detailed areas (high color fluctuation areas) are grouped together. The detailed areas cannot be compressed using GBS transform, so the server may try to group all the detailed areas together. In at least one example embodiment, a plurality of shells among the second set of shapes are identified by tracing around each shape of the second set of shapes for determining an edge of each shape. The shells are shapes and are traced around to identify edge of the shape. In an example, the shells are treated exactly like larger shapes but will be much smaller than normal shapes. The color values of the shells are determined for approximating outline of the shells.

At operation 504, a plurality of color values, for example, RGB values for each pixel in each shell is determined for determining texture of the shapes.

At operation 506, the shells are limited to 255 shells per frame. Accordingly, a total of 65025 pixels are allowed per detailed area as 255 pixels per shell are allowed by CASM which accounts to 255*255=65025. At operation 508, the shells are scanned by the server.

At operation 510, color values are created for the shells from a sine wave transform. The sine waves are generated from a chart of sine wave modifiers for each shell. For example, one or more sine waves are generated for each shell/shape based on the shape and the plurality of colour values using sine wave modifiers. The one or more sine waves are modified and updated to closely match the shape and the texture of each shape of the second set of shapes.

At operation 512, the sine wave that best matches the data contained in the detailed areas is chosen as a first shape of the detailed area. The sine wave will be used as a new base. New waves can now be easily generated by changing characteristics of the base. At operation 514, the detailed areas use the base as well as sine wave transform to represent data contained in the detailed areas. Once the shapes are determined in the detailed areas, the LST can be performed on the shapes to compress the detailed areas. The base and the sine wave transform allow for accurate generation of LST waves.

Figure 6:
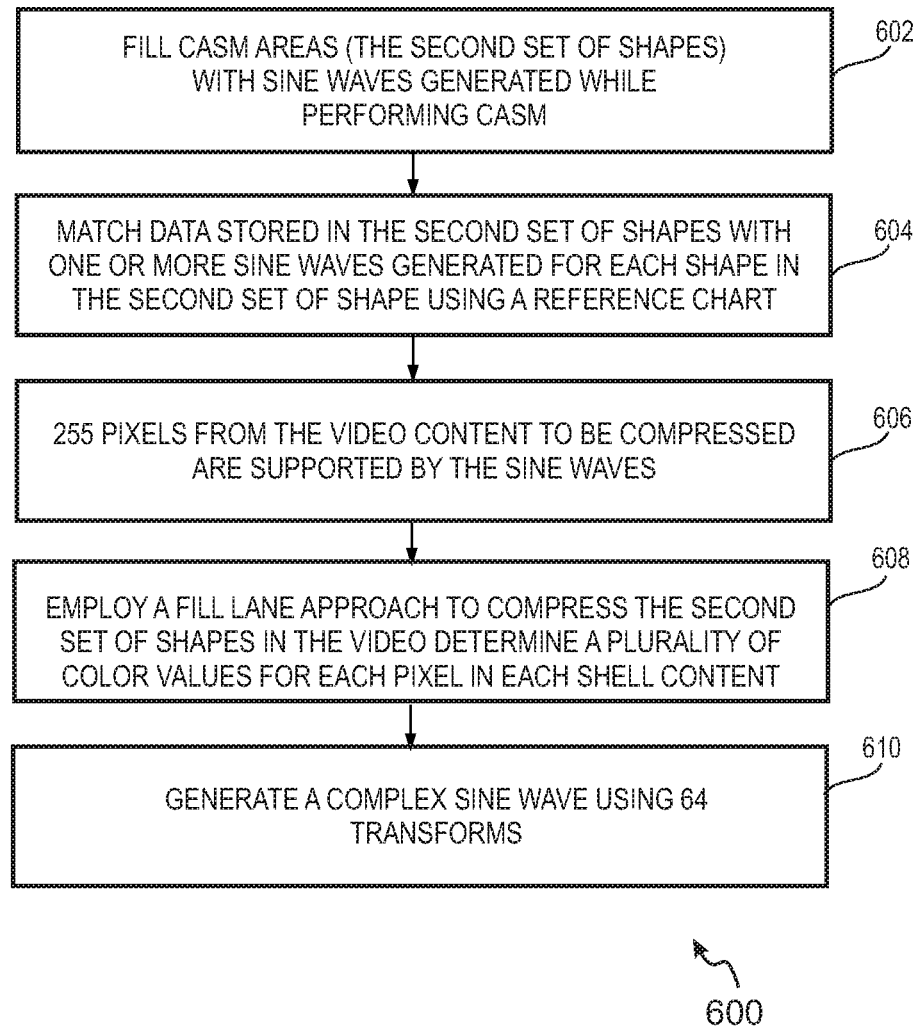
FIG. 6 is a flowchart of a method for performing a Layered Sine wave Transform (LST) for compressing the second set of shapes, in accordance with an example embodiment.

FIG. 6 is a flowchart illustrating a method 600 for performing a layered sine wave transform (LST) on CASM areas, in accordance with an example embodiment. The sequence of operations of the method 600 may not be necessarily executed in the same order as they are presented. Further, one or more operations may be grouped together and performed in form of a single step, or one operation may have several sub-steps that may be performed in parallel or in sequential manner.

At operation 602, the CASM areas (the second set of shapes) are filled with sine waves generated while performing CASM. At operation 604, a reference chart is used to match data stored in the second set of shapes with one or more sine waves generated for each shape in the second set of shape. The reference chart may have 64 modifiers, where each modifier may keep changing the sine wave function to better match each shape of the second set of shapes. For example, the one or more sine waves are modified and updated to closely match the shape and the texture of each shape of the second set of shapes. The 64 modifiers help in representing the wave by maximum of 8 bytes.

At operation 606, 255 pixels from the video content to be compressed are supported by the sine waves.

At operation 608, a fill lane (or fill path) approach is employed to compress the shapes in the video content. The RGB values of each pixel of the 255 pixels are determined as a set of wave data. The three color values (RGB) are plotted separately in a graph based on a shape order determined in CASM. The shape order in which the RGB values of the 255 pixels are plotted is also referred to as 'fill path'. The set of wave data includes array data corresponding to the one or more sine waves for each shell of the plurality of shells. Each array in the set of wave data starts with the same pixel for the shape but each has only red, green, or blue data. In an embodiment, each color value for a pixel is plotted on the graph which has pixel count (0 to 255) as the x-axis and the y-axis is centered at the y value of the first color value. The bottom most level is 0, meaning no color (or black) and the top level is 255 meaning maximum saturation (or white). The sine wave is sent down the center of the y-axis at a pixel count of 127. A sine wave closely matching the data will be created from a preset chart. All the functions in the preset chart are based on the algorithm $$f(x)=a \sin(Bx-c)+d$$

The preset chart has 64 modifiers, each changing the wave function to better match the set of wave data. Accordingly, three sine wave functions are generated for the red, green, and blue data of each shape.

At operation 610, a complex sine wave is created from the three sine wave functions using 64 transforms. For example, a secondary sine wave is created based on the set of wave data and is further modified and adapted to match the set of wave data. In an embodiment, one or more transforms are applied on the secondary sine wave to generate the complex sine wave. The set of wave data is further compressed using the complex sine wave generated by the server 108.

Figure 7:
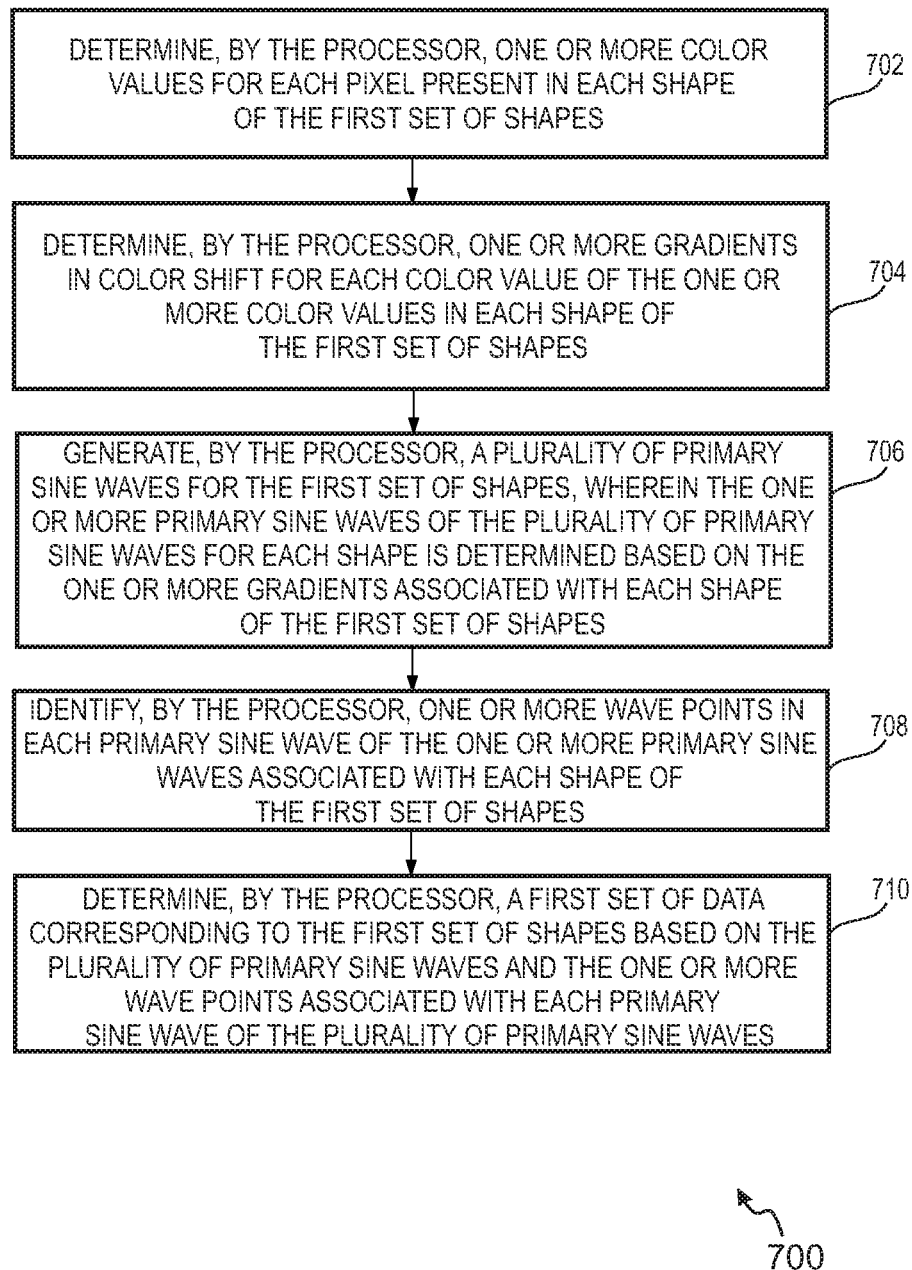
FIG. 7 is a flowchart of a method for performing a Generalized Bulk Sine wave transform for compressing a first set of shapes with areas of low color fluctuations, in accordance with an example embodiment.

FIG. 7 is a flowchart illustrating a method 700 for performing a generalized bulk sine wave (GBS) transform on a first set of shapes including areas with low color fluctuations, in accordance with an example embodiment. The sequence of operations of the method 700 may not be necessarily executed in the same order as they are presented. Further, one or more operations may be grouped together and performed in form of a single step, or one operation may have several sub-steps that may be performed in parallel or in sequential manner.

At operation 702, the method 700 includes determining, by the processor, one or more color values for each pixel present in each shape of the first set of shapes. For example, RGB values of each pixel in the shape S1 may be determined. The RGB (Red, Green and Blue) values for each pixel of each shape of the first set of shapes with low color fluctuations areas is read and stored by the server. In an example, the R values of a shape are grouped together and similarly G, B values are grouped together for each shape in the first set of shapes.

At operation 704, the method 700 includes determining, by the processor, one or more gradients in color shift for each color value of the one or more color values in each shape of the first set of shapes. For instance, the colour values for the pixels in each shape (e.g., shape S1) are plotted to determine a gradient of color shifts of the pixels in the shape S1. The gradient is a direction in which a shadow or color shift occurs. The gradient is determined using standard deviation and variance to see the direction in which the RGB values decrease or increase. In an example, the R values are used to plot a gradient ($G_{11}$) for the red values, the G values are used to plot a gradient ($G_{12}$) and the B values are used to plot a gradient ($G_{13}$) for the shape S1. The server can plot the gradient fill direction in 8 directions in lines as arrangement of pixels is done in form of a grid, and to keep things simple, the 4 corners and the 4 sides are used as pixels.

At operation 706, the method 700 includes generating, by the processor, a plurality of primary sine waves for the first set of shapes. The one or more primary sine waves of the plurality of primary sine waves for each shape is determined based on the one or more gradients associated with each shape of the first set of shapes. In an embodiment, each gradient (e.g., $G_{11}$) is compared with a repository comprising multiple sine waves for determining a primary sine wave that closely matches the gradient of the shape S1. For example, if primary sine wave P1 matches the gradient $G_{11}$ for R value of the shape S1, then primary sine wave P1 may be used to represent the gradient $G_{11}$. Similarly, each gradient of a plurality of gradients associated with each shape of the first set of shapes is matched with sine waves in the repository of sine waves to determine the plurality of primary sine waves.

At operation 708, the method 700 includes identifying, by the processor, one or more wave points in each primary sine wave of the one or more primary sine waves associated with each shape. The one or more wave points comprising data values for reconstructing each primary sine wave. The wave points refer to samples of the primary sine wave that may be used to reconstruct the primary sine wave. An example of determining wave points is more like performing sampling at specific points in each primary sine wave so as to collect data values that may be used for reconstructing the primary sine wave. In at least one example embodiment, the plurality of primary sine waves is grouped into a set of waves. The plurality of primary sine waves may be grouped into chunks of 8, 16, 32, 64, 128, 255 waves. For example, the plurality of primary sine waves are grouped into bundles of 255 waves, on the assumption that only the first wave needs to be sent in its entirety, and data corresponding to subsequent waves remaining after the first wave among the plurality of primary sine waves can be shared using wave points. It shall be noted that the term 'wave points' refer to at least a part of wave including data values that can be used to reconstruct the plurality of primary sine waves. Changing wave points to match data included in the plurality of primary sine waves (excluding the first wave of the plurality of primary sine waves) can adapt better to match colors in the first set of shapes. The cut off of waves is placed at 255, as after 255, each wave needs to be rebuilt, and the single bit count is limited to 255.

At operation 710, the method 700 includes determining, by the processor, a first set of data corresponding to the first set of shapes based on the plurality of primary sine waves and the one or more wave points associated with each primary sine wave of the plurality of primary sine waves.

Figure 8:
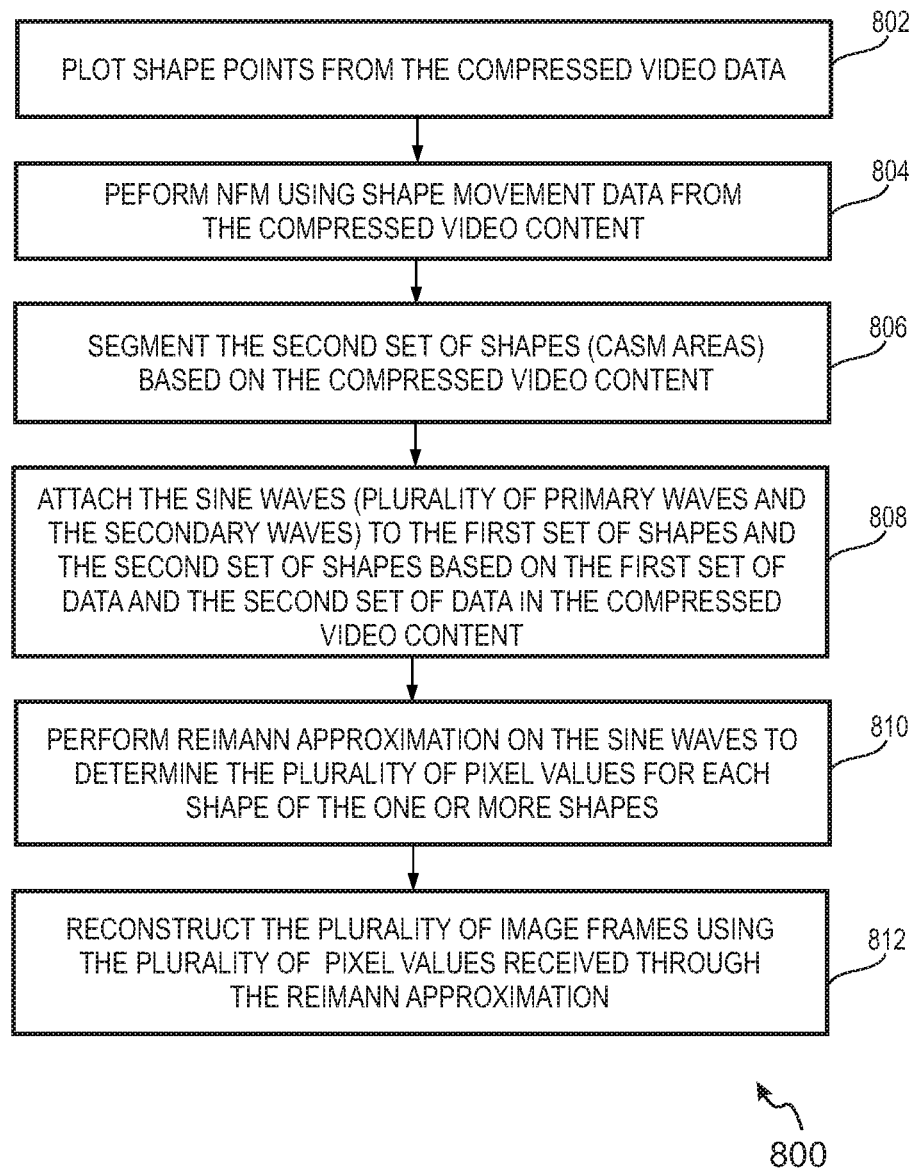
FIG. 8 is a flowchart illustrating a method for decompressing a compressed video content, in accordance with an example embodiment.

FIG. 8 is a flowchart illustrating a method 800 for decompressing the compressed data, in accordance with an example embodiment. The operations of the method 800 may be carried out by an electronic device, such as the electronic device 112 or a server such as the server 108. The sequence of operations of the method 800 may not be necessarily executed in the same order as they are presented. Further, one or more operations may be grouped together and performed in form of a single step, or one operation may have several sub-steps that may be performed in parallel or in sequential manner.

At operation 802, after receiving the compressed video content, the shape points are plotted from the compressed video data. At operation 804, the shape movement data from the compressed video content is used to perform NFM. The NFM helps in plotting key points and creating shapes present in the plurality of frames of the video content from the compressed video content.

At operation 806, the second set of shapes (CASM areas) is segmented based on the compressed video content. The CASM areas will be decompressed separately from rest of areas (or the first set of shapes). The CASM areas will be decompressed using LST. The rest of the areas will be decompressed by running NFM and GBS transform.

At operation 808, the sine waves (plurality of primary waves and the secondary waves) are attached to the first set of shapes and the second set of shapes based on the first set of data and the second set of data in the compressed video content. The sine waves are attached to respective shapes in the same order as the order attached with them. At operation 810, the Reimann approximation is run on the sine waves to get the plurality of pixel values for each shape of the one or more shapes. For example, the color data/color values of each pixel in each shape of the one or more shapes (first set of shapes and the second set of shapes) are retrieved by employing Riemann approximation. The Riemann Approximation will fill the high color fluctuation areas (CASM areas) and the low color fluctuation areas.

At operation 812, the pixel values received through the Reimann approximation are stored at appropriate location. This will help in reconstructing an image frame. At operation 814, the reconstructed image frame is displayed on a screen of the mobile device.

Figure 9:
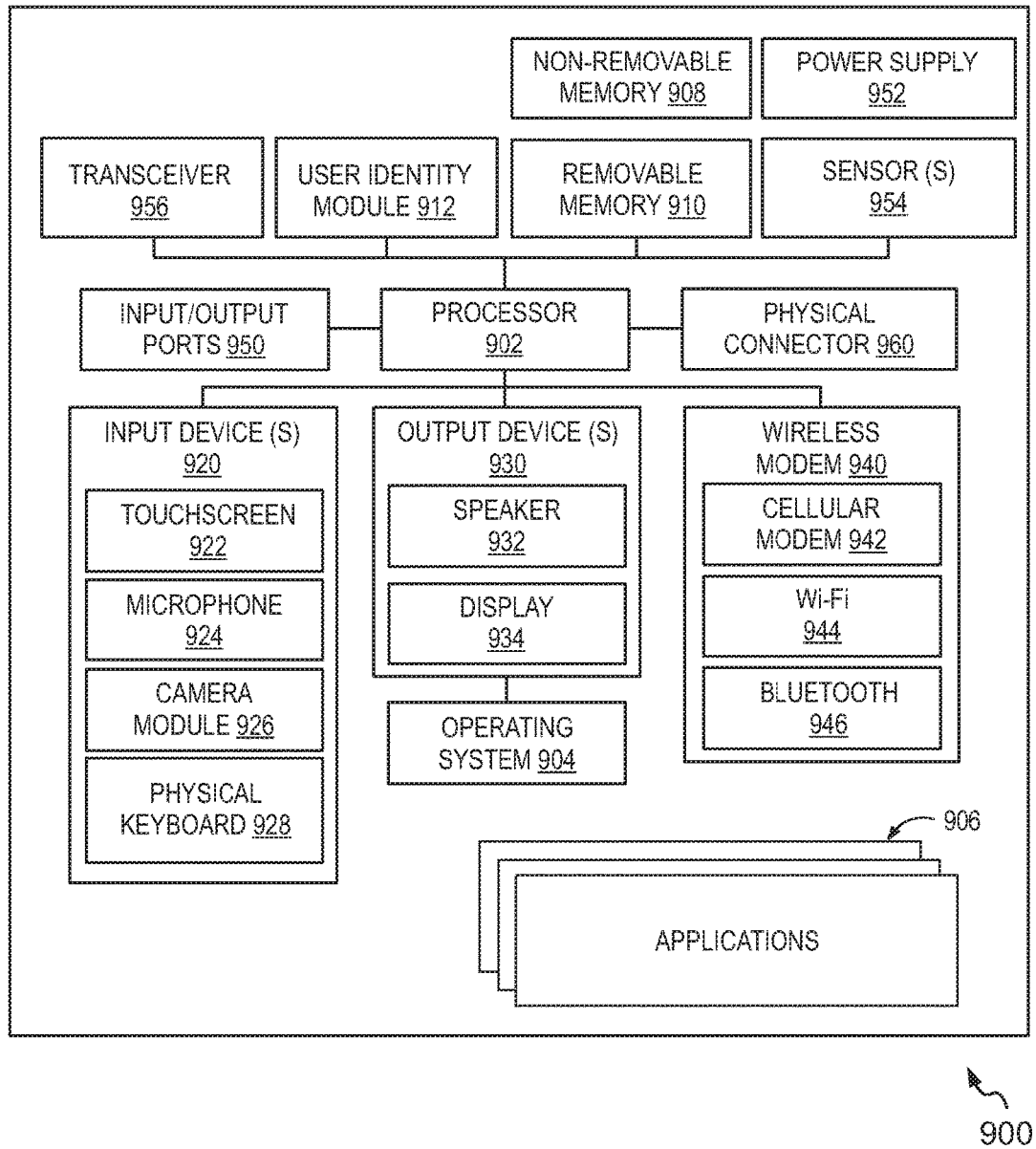
FIG. 9 is a block diagram of an electronic device, in accordance with an example embodiment.

FIG. 9 shows a simplified block diagram of an electronic device 900 capable of implementing the various embodiments of the present disclosure. The electronic device 900 may be an example of the electronic devices 104 and 112. In an embodiment, the various operations related to video compression and decompression can be facilitated by the electronic device 900. It should be understood that the electronic device 900 as illustrated and hereinafter described is merely illustrative of one type of device and should not be taken to limit the scope of the embodiments. As such, it should be appreciated that at least some of the components described below in connection with that the electronic device 900 may be optional and thus in an example embodiment may include more, less or different components than those described in connection with the example embodiment of the FIG. 9. As such, among other examples, the electronic device 900 could be any of a mobile electronic device or may be embodied in any of the electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 900 includes a controller or a processor 902 (e.g., a signal processor, microprocessor, ASIC, or other control and processing logic circuitry) for performing such tasks as signal coding, data processing, image processing, input/output processing, power control, and/or other functions. An operating system 904 control the allocation and usage of the components of the electronic device 900 and support for one or more applications programs that implements one or more of the innovative features described herein. The applications 906 may include common mobile computing applications (e.g., telephony applications, email applications, calendars, contact managers, web browsers, messaging applications such as USSD messaging or SMS messaging or SIM Tool Kit (STK) application) or any other computing application. The applications 906 also include an application that provides compression, decompression and playback of multimedia.

The illustrated electronic device 900 includes one or more memory components, for example, a non-removable memory 908 and/or a removable memory 910. The non-removable memory 908 and/or the removable memory 910 may be collectively known as database in an embodiment. The non-removable memory 908 can include RAM, ROM, flash memory, a hard disk, or other well-known memory storage technologies. The removable memory 910 can include flash memory, smart cards, or a Subscriber Identity Module (SIM). The one or more memory components can be used for storing data and/or code for running the operating system 904 and the healthcare costs or medical rewards management. The electronic device 900 may further include a user identity module (UIM) 912. The UIM 912 may be a memory device having a processor built in. The UIM 912 may include, for example, a subscriber identity module (SIM), a universal integrated circuit card (UICC), a universal subscriber identity module (USIM), a removable user identity module (R-UIM), or any other smart card. The UIM 912 typically stores information elements related to a mobile subscriber. The UIM 912 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 900 can support one or more input devices 920 and one or more output devices 930. Examples of the input devices 920 may include, but are not limited to, a touch screen/a display screen 922 (e.g., capable of capturing finger tap inputs, finger gesture inputs, multi-finger tap inputs, multi-finger gesture inputs, or keystroke inputs from a virtual keyboard or keypad), a microphone 924 (e.g., capable of capturing voice input), a camera module 926 (e.g., capable of capturing still picture images and/or video images) and a physical keyboard 928. Examples of the output devices 930 may include, but are not limited to a speaker 932 and a display 934. Other possible output devices can include piezoelectric or other haptic output devices.

Some devices can serve more than one input/output function. For example, the touch screen 922 and the display 934 can be combined into a single input/output device.

A wireless modem 940 can be coupled to one or more antennas (not shown in the FIG. 9) and can support two-way communications between the processor 902 and external devices, as is well understood in the art. The wireless modem 940 is shown generically and can include, for example, a cellular modem 942 for communicating at long range with the mobile communication network, a Wi-Fi compatible modem 944 for communicating at short range with an external Bluetooth-equipped device or a local wireless data network or router, and/or a Bluetooth-compatible modem 946. The wireless modem 940 is typically configured for communication with one or more cellular networks, such as a GSM network for data and voice communications within a single cellular network, between cellular networks, or between the electronic device 900 and a public switched telephone network (PSTN).

The electronic device 900 can further include one or more input/output ports 950, a power supply 952, one or more sensors 954 for example, an accelerometer, a gyroscope, a compass, or an infrared proximity sensor for detecting the orientation or motion of the electronic device 900, a transceiver 956 (for wirelessly transmitting analog or digital signals) and/or a physical connector 960, which can be a USB port, IEEE 1294 (FireWire) port, and/or RS-232 port. The illustrated components are not required or all-inclusive, as any of the components shown can be deleted and other components can be added.

Figure 10:
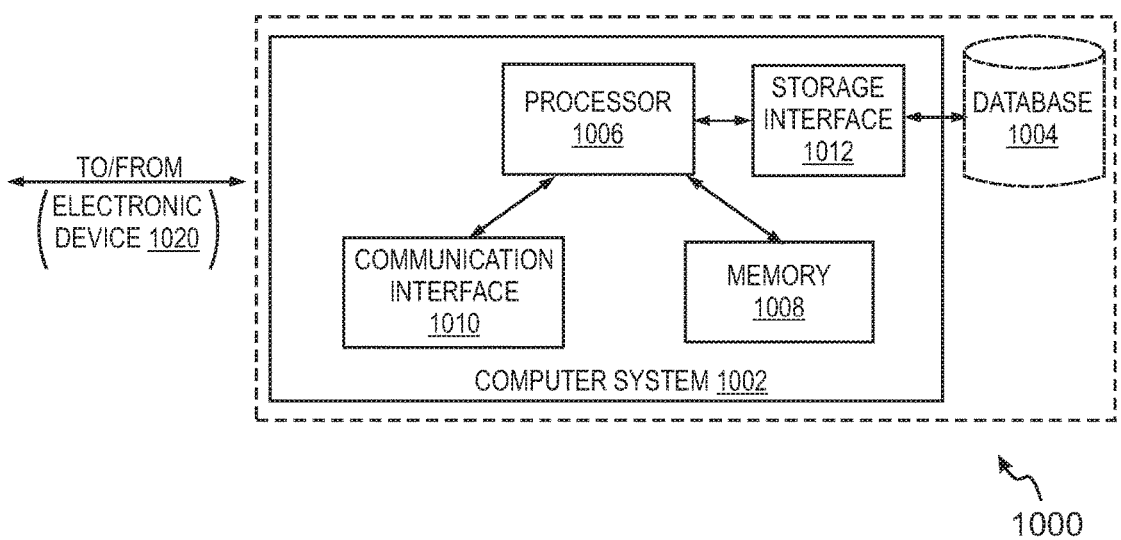
FIG. 10 is a schematic block diagram representation of the server of FIG. 1, in accordance with an example embodiment.

FIG. 10 is a simplified block diagram of a server system 1000, in accordance with one embodiment of the present disclosure. The server system 1000 is an example of the server 108 shown and explained with reference to FIG. 1. The server system 1000 includes a computer system 1002 and one or more database, such as a database 1004.

The computer system 1002 includes a processor 1006 for executing instructions. Instructions may be stored in, for example, but not limited to, a memory 1008. The processor 1006 may include one or more processing units (e.g., in a multi-core configuration). The processor 1006 is operatively coupled to a communication interface 1010 such that the computer system 1002 is capable of communicating with a remote device such as an electronic device 1020. Some examples of the electronic device 1020 may include, but are not limited to the electronic devices 104 and 112 shown in FIG. 1.

The processor 1006 may also be operatively coupled to the database 1004. The database 1004 is configured to store the video streaming application capable of performing video compression as explained with reference to FIGS. 1 to 9. The database 1004 is any computer-operated hardware suitable for storing and/or retrieving data. The database 1004 may include multiple storage units such as hard disks and/or solid-state disks in a redundant array of inexpensive disks (RAID) configuration. The database 1004 may include, but not limited to, a storage area network (SAN) and/or a network attached storage (NAS) system.

In some embodiments, the database 1004 is integrated within the computer system 1002. For example, the computer system 1002 may include one or more hard disk drives as the database 1004. In other embodiments, the database 1004 is external to the computer system 1002 and may be accessed by the computer system 1002 using a storage interface 1012. The storage interface 1012 is any component capable of providing the processor 1006 with access to the database 1004. The storage interface 1012 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 1006 with access to the database 1004.

The memory 1008 is a storage device embodied as one or more volatile memory devices, one or more non-volatile memory devices, and/or a combination of one or more volatile memory devices and non-volatile memory devices, for storing micro-contents information and instructions. The memory 1008 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (Blu-ray® Disc), and semiconductor memories (such as mask ROM, PROM (programmable ROM), EPROM (erasable PROM), flash ROM, RAM (random access memory), etc.,).

The disclosed systems and methods with reference to FIGS. 1 to 10, or one or more operations of the flow diagram 200-800 may be implemented using software including computer-executable instructions stored on one or more computer-readable media (e.g., non-transitory computer-readable media, such as one or more optical media discs, volatile memory components (e.g., DRAM or SRAM), or non-volatile memory or storage components (e.g., hard drives or solid-state non-volatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

Various example embodiments offer, among other benefits, techniques for establishing a system and a method for video compression using a dynamic vector wave compression and thereby provide a unique set of transforms. The transforms ensure a maximum reduction in bandwidth which ensures faster loading of the video and simplifies the viewing experience. The method is fully scalable to any resolution as only one data stream is needed to be transferred instead of the normal three which further reduces the amount of data required for uploading/transferring video content. The system requires no preset video formats for the compression system to work, thus any video can be uploaded and will be usable for that input. Further, the method easily automates the compression process.

Although the invention has been described with reference to specific exemplary embodiments, it is noted that various modifications and changes may be made to these embodiments without departing from the broad spirit and scope of the invention. For example, the various operations, blocks, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the apparatuses and methods may be embodied using transistors, logic gates, and electrical circuits (for example, application specific integrated circuit (ASIC) circuitry and/or in Digital Signal Processor (DSP) circuitry).

The present disclosure is described above with reference to block diagrams and flowchart illustrations of method and system embodying the present disclosure. It will be understood that various block of the block diagram and flowchart illustrations, and combinations of blocks in the block diagrams and flowchart illustrations, respectively, may be implemented by a set of computer program instructions. These set of instructions may be loaded onto a general-purpose computer, special purpose computer, or other programmable data processing apparatus to cause a device, such that the set of instructions when executed on the computer or other programmable data processing apparatus create a means for implementing the functions specified in the flowchart block or blocks. Although other means for implementing the functions including various combinations of hardware, firmware and software as described herein may also be employed.

Various embodiments described above may be implemented in software, hardware, application logic or a combination of software, hardware and application logic. The software, application logic and/or hardware may reside on at least one memory, at least one processor, an apparatus or, a non-transitory computer program product. In an example embodiment, the application logic, software or an instruction set is maintained on any one of various conventional computer-readable media. In the context of this document, a "computer-readable medium" may be any non-transitory media or means that can contain, store, communicate, propagate or transport the instructions for use by or in connection with an instruction execution system, apparatus, or device, such as a computer. A computer-readable medium may comprise a computer-readable storage medium that may be any media or means that can contain or store the instructions for use by or in connection with an instruction execution system, apparatus, or device, such as a computer.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application and/or implementation without departing from the spirit or scope of the claims.

What is claimed is:

1. A method, comprising:
   receiving, by a processor, a video content comprising a plurality of image frames;
   identifying, by the processor, one or more shapes in each image frame of the plurality of image frames, each shape of the one or more shapes being associated with at least:
     a shape point for identifying each shape; and
     a key point indicating location coordinates of each shape;
   classifying, by the processor, each shape of the one or more shapes into at least one of:
     a first set of shapes, wherein the first set of shapes are associated with areas in an image frame which have a color fluctuation less than a threshold value; and
     a second set of shapes, wherein the second set of shapes are associated with areas in the image frame which have a color fluctuation greater than the threshold value;
   determining, by the processor, movement of each shape of the one or more shapes across the plurality of image frames by three-dimensional vector analysis for determining a set of shape movement data based on a preset compression level, wherein the movement of each shape is represented as the shape point of the shape, the key point of the shape, a current location of the shape, a set of coordinates that the key point moved to and a distance of movement;
   generating, by the processor, a first set of data by performing a generalized bulk sine wave (GBS) transform for the first set of shapes based on the preset compression level;
   generating, by the processor, a second set of data by performing a complex area shell management (CASM) and a layered sine wave transform (LST) for the second set of shapes based on the preset compression level; and
   storing, by the processor, a compressed video content as array data, the compressed video content comprising the first set of data, the second set of data and the set of shape movement data.

2. The method as claimed in claim 1, wherein performing the GBS transform comprises:
   determining, by the processor, one or more color values for each pixel present in each shape of the first set of shapes;
   determining, by the processor, one or more gradients in color shift for each shape, wherein each gradient is associated with a color of the one or more color values in each shape of the first set of shapes; and
   generating, by the processor, a plurality of primary waves for the first set of shapes, wherein one or more primary waves of the plurality of primary waves associated with each shape is determined based on the one or more gradients associated with each shape of the first set of shapes.

3. The method as claimed in claim 2, wherein generating the plurality of primary waves comprises:
   determining, by the processor, the one or more primary sine waves for each shape by matching each gradient of the one or more gradients of each shape with at least one primary sine wave of a repository of sine waves.

4. The method as claimed in claim 3, further comprising:
   identifying, by the processor, one or more wave points in each primary sine wave of the one or more primary sine waves associated with each shape, the one or more wave points comprising data values for reconstructing each primary sine wave; and determining, by the processor, the first set of data corresponding to the first set of shapes based on the plurality of primary sine waves and the one or more wave points associated with each primary sine wave of the plurality of primary sine waves.

5. The method as claimed in claim 1, wherein performing the CASM for the second set of shapes comprises:

identifying, by the processor, one or more shells among the second set of shapes by tracing around each shape of the second set of shapes for determining edge of each shape and one or more parameters of each shape;

reading, by the processor, a plurality of color values for each pixel in each shell of the one or more shells;

generating, by the processor, one or more sine waves for each shell of the plurality of shells based on sine wave modifiers; and determining, by the processor, a set of wave data for the plurality of shells, wherein the set of wave data corresponds to one or more sine waves for each shell of the plurality of shells.

6. The method as claimed in claim 5, further comprising:

selecting, by the processor, a secondary sine wave for the second set of shapes from a repository of sine waves, wherein the secondary sine wave is selected for the second set of shapes based on the set of wave data; and modifying, by the processor, the secondary sine wave for adapting to the set of wave data.

7. The method as claimed in claim 6, wherein performing the LST comprises:

filling, by the processor, each shape of the second set of shapes with corresponding one or more sine waves;

generating, by the processor, a complex sine wave from the secondary sine wave using a plurality of transforms; and compressing, by the processor, the set of wave data corresponding to the second set of shapes using the complex sine wave for generating the second set of data.

8. The method as claimed in claim 1, wherein the preset compression level is determined by defining one or more of:

a total number of shapes per frame;

a predefined range for change in angle of the one or more shapes; and a number of sine wave functions for defining each shape of the second set of shapes.

9. The method as claimed in claim 1, wherein the array data is combination of arrays created for each of the first set of data, the second set of data and the set of shape movement data.

10. The method as claimed in claim 9, wherein the array data is compressed using one or more compression techniques to generate a compressed video content of the video content.

11. The method as claimed in claim 9, further comprising:

generating, by the processor, one or more reconstruction equations for each shape of the one or more shapes, the one or more reconstruction equations comprising an angle of movement and a distance of movement, wherein the distance of movement of each shape of the one or more shapes defines movement of each shape across at least a set of image frames among the plurality of image frames; and storing, by the processor, the one or more reconstruction equations with the compressed video content.

12. The method as claimed in claim 11, further comprising:

receiving, by the processor, a user request for the video content from a user device; and sending, by the processor, the compressed video content to the user device, wherein the user device is configured to reconstruct the one or more shapes from the compressed video content by performing:

plotting the key points for each shape from the array data;

accessing the shape movement data and the one or more reconstruction equations for plotting key points in subsequent image frames among the plurality of image frames, and decompressing the first set of data using the GBS transform for determining the plurality of primary waves;

decompressing the second set of data using the CASM and the LST for determining the one or more sine waves for each shape of the second set of shapes;

attaching each primary wave of the plurality of primary waves to a corresponding shape of the first set of shapes;

attaching the one or more sine waves corresponding to each shape of the second set of shapes; and executing a Reimann approximation on at least the plurality of primary waves of the first set of shapes and the one or more sine waves corresponding to each shape of the second set of shapes for reconstructing the plurality of image frames in the video content.

13. A server system, comprising:

a memory configured to store instructions; and a processor configured to execute the instructions stored in the memory and thereby cause the server system to perform:

receiving a video content comprising a plurality of image frames;

identifying one or more shapes in each image frame of the plurality of image frames, each shape of the one or more shapes being associated with at least:

a shape point for identifying each shape; and a key point indicating location coordinates of each shape;

classifying each shape of the one or more shapes into at least one of:

a first set of shapes, wherein the first set of shapes are associated with areas in an image frame which have a color fluctuation less than a threshold value; and a second set of shapes, wherein the second set of shapes are associated with areas in the image frame which have a color fluctuation greater than a threshold value;

determining movement of each shape of the one or more shapes across the plurality of image frames by three-dimensional vector analysis for determining a set of shape movement data based on a preset compression level, wherein the movement of each shape is represented as the shape point of the shape, the key point of a shape, a current location of the shape, a set of coordinates that the point moved to and a distance of movement;

generating a first set of data by performing a generalized bulk sine wave (GBS) transform for the first set of shapes based on the preset compression level;

generating a second set of data by performing a complex area shell management (CASM) and a layered sine wave transform (LST) for the second set of shapes based on the preset compression level; and storing a compressed video content as array data, the compressed video content comprising the first set of data, the second set of data and the set of shape movement data.

14. The server system as claimed in claim 13, wherein, for performing the generalized bulk sine wave (GBS) transform, the server system is configured to perform:

determining one or more color values for each pixel present in each shape of the first set of shapes;

determining one or more gradients in color shift for each color value of the one or more color values in each shape of the first set of shapes; and generating a plurality of primary waves for the first set of shapes, wherein one or more primary waves of the plurality of primary waves for each shape is determined based on the one or more gradients associated with each shape of the first set of shapes.

15. The server system as claimed in claim 14, wherein for generating the plurality of primary waves the server system is configured to perform:

determining the one or more primary sine waves for each shape by matching each gradient of the one or more gradients of each shape with at least one primary sine wave of a repository of sine waves.

16. The server system as claimed in claim 15, wherein the server system is further configured to perform:

identifying one or more wave points in each primary sine wave of the one or more primary sine waves associated with each shape, the one or more wave points comprising data values for reconstructing each primary sine wave; and determining the first set of data corresponding to the first set of shapes based on the plurality of primary sine waves and the one or more wave points associated with each primary sine wave of the plurality of primary sine waves.

17. The server system as claimed in claim 13, wherein, for performing the complex area shell management (CASM) for the second set of shapes, the server system is further configured to perform:

identifying one or more shells among the second set of shapes by tracing around each shape of the second set of shapes for determining edge of each shape and one or more parameters associated with each shape;

reading a plurality of color values for each pixel in each shell of the one or more shells;

generating one or more sine waves for each shell of the plurality of shells based on sine wave modifiers; and determining a set of wave data for the plurality of shells, wherein the set of wave data corresponds to one or more sine waves for each shell of the plurality of shells.

18. The server system as claimed in claim 17, wherein the server system is further configured to perform:

selecting a secondary sine wave for the second set of shapes from a repository of sine waves, wherein the secondary sine wave is selected for the second set of shapes based on the set of wave data; and modifying the secondary sine wave for adapting to the set of wave data.

19. The server system as claimed in claim 18, wherein for performing the Layered Sine wave Transform (LST) the server system is configured to perform:

filling each shape of the second set of shapes with corresponding one or more sine waves;

generating a complex sine wave from the secondary sine wave using a plurality of transforms; and compressing the set of wave data corresponding to the second set of shapes using the complex sine wave for generating the second set of data.

20. The server system as claimed in claim 13, wherein the server system is further configured to perform:

generating one or more reconstruction equations for each shape of the one or more shapes, the one or more reconstruction equations comprising an angle of movement and a distance of movement, wherein the distance of movement of each shape of the one or more shapes defines movement of the shape across at least a set of image frames among the plurality of image frames; and storing the one or more reconstruction equations with the compressed video content.

21. The server system as claimed in claim 20, wherein the server system is further configured to perform:

receiving a user request for the video content from a user device; and sending the compressed video content to the user device, wherein the user device is configured to reconstruct the one or more shapes from the compressed video content by performing:

plotting the key points for each shape from the array data;

accessing the shape movement data and the one or more reconstruction equations for plotting key points in subsequent image frames among the plurality of image frames;

decompressing the first set of data using the GBS transform for determining the plurality of primary waves;

decompressing the second set of data using the CASM and the LST for determining the one or more sine waves for each shape of the second set of shapes;

attaching each primary wave of the plurality of primary waves to a corresponding shape of the first set of shapes;

attaching the one or more sine waves corresponding to each shape of the second set of shapes; and executing a Reimann approximation on at least the plurality of primary waves and the one or more sine waves corresponding to each shape of the second set of shapes for reconstructing the plurality of image frames in the video content.

* * * * *